Figure 1:
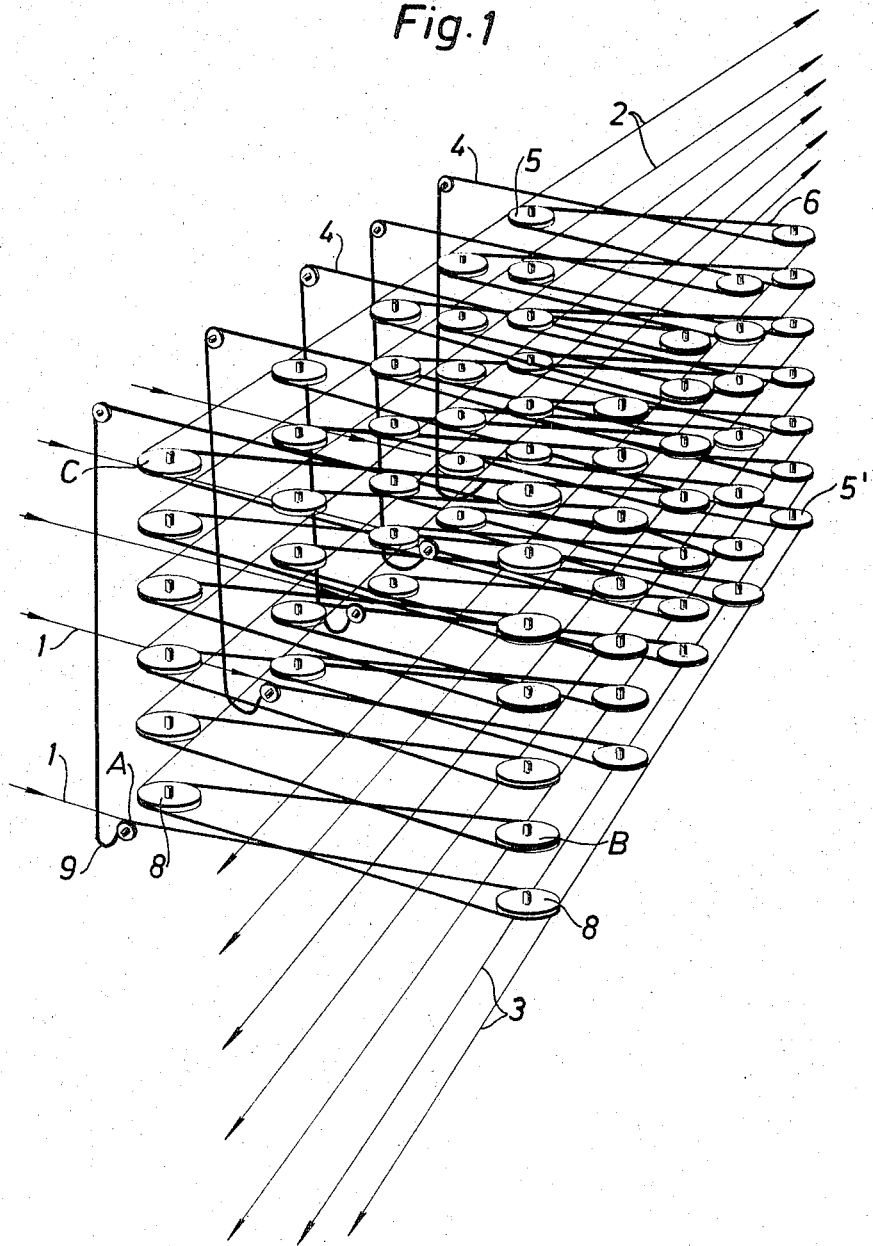

United States Patent [19]
Wahren

[11] 3,845,853
[45] Nov. 5, 1974

[54] SYSTEM FOR INTERCONNECTING CONTINUOUSLY OPERATING CONVEYOR PATHS

[76] Inventor: Janne Ragnvald Ejvin Wahren, Mastargrand 4, 592 00 Vadstena, Sweden

[22] Filed: June 14, 1972

[21] Appl. No.: 262,764

[30] Foreign Application Priority Data
July 23, 1971 Sweden.............................. 9547/71

[52] U.S. Cl.................................... 198/78, 198/136
[51] Int. Cl........................................... B65g 37/00
[58] Field of Search ................ 198/78, 38, 136, 20; 214/16.1 A

[56] References Cited
UNITED STATES PATENTS
1,090,948   3/1914   Sklozsky et al.................... 198/78 X
2,887,855   5/1959   Glass............................. 198/136 X
3,318,439   5/1967   Sullivan.......................... 198/136 X FOREIGN PATENTS OR APPLICATIONS
1,103,847   3/1957   Germany Primary Examiner—Richard A. Schacher
Assistant Examiner—Douglas D. Watts
Attorney, Agent, or Firm—Hill, Gross, Simpson, Van Santen, Steadman, Chiara & Simpson

[57] ABSTRACT

A group of incoming continuously operating conveyor belts in a first plane are connected to two or more continuously operating connecting loops. The loops are connected to outgoing continuously operating conveyor belts in separate planes. Each loop comprises a continuously operating conveyor belt having a helical section guided over opposite direction rollers and a portion extending downwardly from top to bottom of the helical section. Coupling means connect the loop selectively with the incoming and outgoing conveyor belts.

6 Claims, 10 Drawing Figures

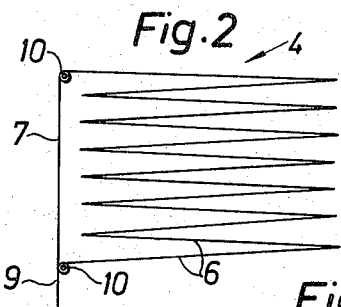
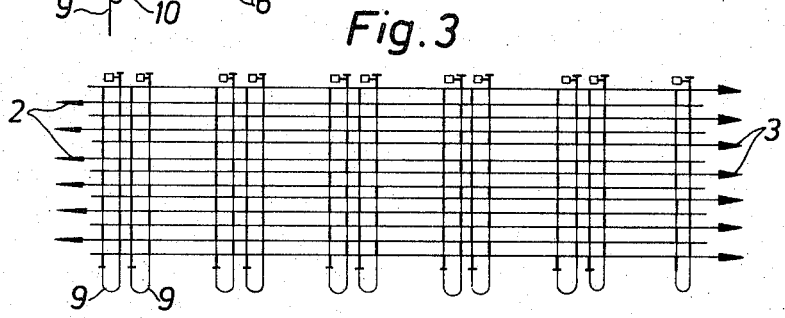
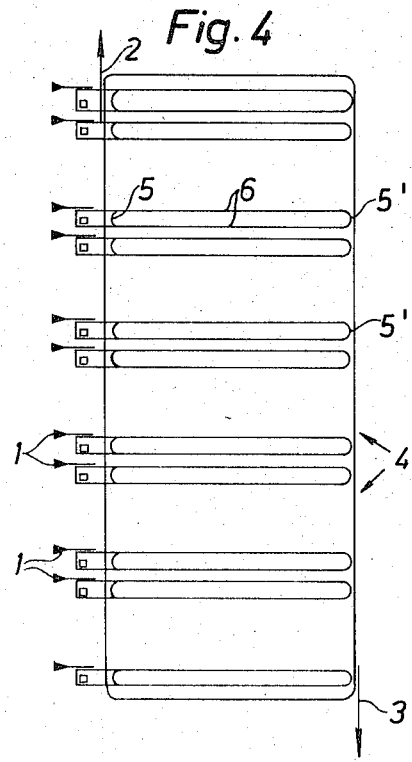
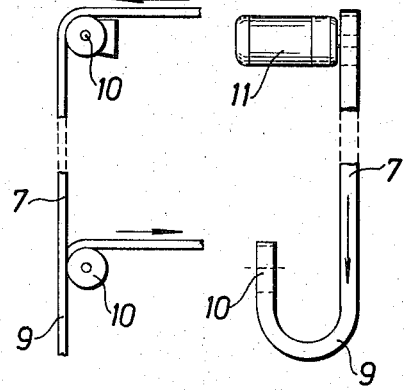
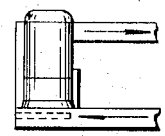

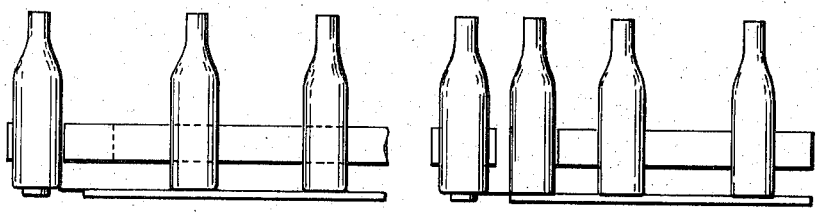
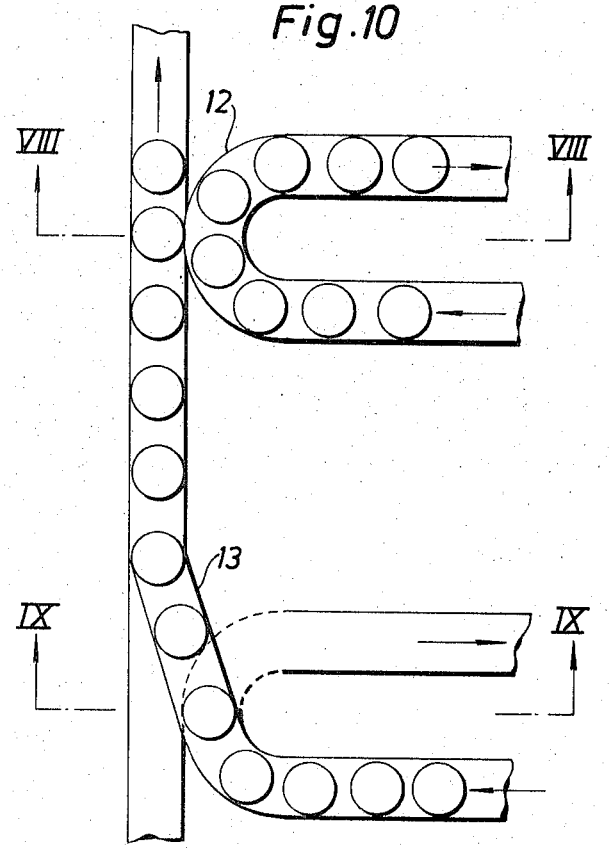

# SYSTEM FOR INTERCONNECTING CONTINUOUSLY OPERATING CONVEYOR PATHS

The present invention relates to a system for interconnecting conveyor belts, preferably continuously operating conveyor belts of the type used for conveying mutually similar, small objects such as bottles and like packaging units in industrial systems with which such units are produced or handled.

Packaging units of the above type are used and produced in very large quantities, and for reasons of an economic nature are normally manufactured in relatively large production plants. An example of this is found in the manufacture of disposable bottles of glass and like containers, which are produced by extensively automated casting techniques at a rate of up to 300 units per minute in respective bottle moulding machines. In large plants using a number of such machines, difficulty is experienced in controlling the stream of containers to respective packaging machines, in which they are packed in groups of specific numbers for transport away from the plant. The entire manufacturing process, up to the point where the containers are removed from the plant, is effected continuously, without the use of a buffer store. Provided that the plant is run to produce disposable glass containers of a certain type, the problem of conveying the containers within the plant can be overcome, since in this case the moulding machine is connected to a packaging machine adapted for the product in question. At times, however, it is desired to use the moulding machine for disposable containers of a different type which, for some reason, are not suited for packaging by the machine connected to the moulding machine. Hitherto this problem has been solved by moving the automatic packaging machines, which is both time-consuming and expensive.

The object of the present invention is to eliminate the above mentioned disadvantage and to provide a conveyor system with which a packaging machine constructed to receive and package containers of a specific type can be readily connected to the moulding machine in which said containers are produced.

This object is obtained by means of the claimed system for interconnecting continuously driven belt conveyors, the system being mainly characterized in that respective conveyor belts are located either separately or in groups in different planes and connected to an endless continuously operated connecting loop extending between the separate planes of the conveyor belts, and in that conventional coupling means are provided for selectively engaging and disengaging the connecting loop in a manner known per se.

The loop for interconnecting the various conveyor belts mainly comprises a conveyor belt having a helical portion having superimposed coils, each of which includes diametrically opposed curved portions which extend over direction rollers and generally rectilinear portions extending between the curved portions. The loop is endless, and extends at its uppermost point into a vertically downwardly directed portion, which connects with the lowermost turn of the helix. To enable the loop to be connected to a number of incoming and outgoing conveyor belts, a corresponding number of coils are arranged side by side in the system. The connection between the conveyor belts and the connecting loops is suitably arranged at the curved portions of the loops. The connecting loop suitably includes a hinged or pivoted conveyor belt which can be extended in the conveying plane and in a direction perpendicular thereto The invention will now be described in detail with reference to the accompanying drawing, in which:

FIG. 1 is a perspective view of one embodiment of the invention, showing the conveyor belts and the connecting loop diagrammatically in the form of straight lines. FIG. 2 is a side view of the connecting loop according to the invention. FIG. 3 is a front view of system incorporating a number of connecting loops with conveyor belts connected thereto. FIG. 4 is a corresponding plan view. FIG. 5 illustrates an element of the connecting loop in larger scale and cooperating drive means as seen from the side. FIG. 6 is a corresponding end view. FIG. 7 is a corresponding plan view. FIG. 8 illustrates a portion of the end part of the connecting loop as seen along the line VIII—VIII in FIG. 10 and shows guide structures for the units being conveyed. FIG. 9 illustrates a portion of the connecting loop between the end part of the loop and a conveyor belt, the view being taken along the line IX—IX in FIG. 10, and FIG. 10 shows corresponding portions in plan view.

With the system diagrammatically illustrated in FIG. 1, the conveyor belts 1 are assumed to be moving in the directions of the arrows drawn therein and to transport disposable glass containers or like products continuously from different manufacturing machines, such as automatic bottle moulding machines, to selected stations. Each incoming conveyor belt 1 is passed to a connecting point at the input portion of the bottom turn of a connecting loop 4. In the illustrated embodiment, all incoming conveyor belts 1 are assumed to lie in one and the same plane. Further, each incoming conveyor belt has a connecting loop 4 coupled therewith, there being five such connecting loops and incoming conveyor belts illustrated in the drawing. In a manner not shown, the conveyor belts continue past the connecting point and return to a starting point not shown. The connecting loop is illustrated more clearly in FIG. 2 and comprises a generally helical portion consisting of a number of helical turns arranged in superposed relationship with respect to each other. Each turn of the helix includes diametrically opposing curved portions 5,5' (FIG. 1), which pass over direction rollers 8, and straight portions 6 (FIG. 2) extending between the curved portions 5,5'. The direction rollers 8 are mounted for rotation on vertical pins secured to a frame structure not shown. The generally straight portions 6 of the connecting loop extend between the direction rollers and are slidably guided in guides in a manner not shown. The connecting loop is guided around the direction rollers in arcuate guides, not shown. From its uppermost point, the connecting loop is passed over a direction roller 10, which is mounted for rotation on a horizontal journal, and a portion 7 of the loop extends vertically downwardly and is reversed at the bottom thereof to form a loop 9, whereafter the portion 7 is continued over a further direction roller 10 and connected to the lowest turn of the helical portion of the connecting loop.

The curved portions 5,5' of the connecting loop are connected to outgoing conveyor belts 2 and 3. These belts pass tangentially to the outer periphery of the curved portions 5 and 5', respectively and in the illustrated embodiment the belts 2 are shown located above the belts 3, the belts 2 being located in one vertical plane at one end of the connecting loops and the belts 3 in another vertical plane at the other end of the loops. In the exemplary embodiment, the number of conveyor belts 3 corresponds to the number of superposed outer curved portions 5' of the connecting loops, while the number of conveyor belts 2 corresponds to the number of superposed portions 5 located diametrically opposite the portions 5'.

With the illustrative system shown in FIG. 1, it is assumed that a coupling means of known construction and intended for conveyor paths of the type envisaged is arranged at each connecting point between some of the conveyor belts 1,2,3 and each connecting point of each connecting loop. The coupling means arranged between the incoming conveyor belts 1 are adjusted for continuous connection with respective connecting loops, while the connecting points between the outgoing conveyor belts 2 and 3 are provided with coupling means which, in the illustrated case, are adapted for engagement and disengagement between the connecting loop and the conveyor belt.

Both the conveyor belts 1, 2 and 3, and the connecting loops 4 are assumed to be continuously driven. The conveyor belt drive means may be in the form of any suitable known means, while the connecting loop drive means has a special construction, hereinafter defined.

By way of example, the outgoing conveyor belts 2 and 3 may be connected to separate packaging machines in a system for producing disposable units, while the incoming conveyor belts 1 convey the product to be packed from respective manufacturing machines. For the purpose of distributing the products to respective packaging machines, the system operates in the following manner. The incoming coveyor belt 1 located nearest the viewer is connected at point A to the nearest located connecting loop 4. The products from the manufacturing machine in question are thus passed to the lower portion of the connecting loop. By way of example, it is assumed that the products are to be conveyed further, along the next lowest outgoing belt 3. This belt is connected at point B to the nearest connecting loop 4. The adjustable coupling means at connecting point B is adjusted to transfer the products from the loop 4 to the relevant outgoing conveyor belt 3, while the coupling means at the remaining connecting points between the loop in question and the remaining belts 2 and 3 are adjusted to render a corresponding transfer therebetween impossible. On the other hand, should a change in the production plan render it necessary to use the packaging machine connected to the upper conveyor belt 2, the transfer coupling at point B is closed and the upper belt 2 is connected to the connecting loop at point C instead. In a corresponding manner, each incoming conveyor belt 1 can be connected to each outgoing conveyor belt 2 or 3.

In accordance with the invention, the connecting loops can also be made to operate in the reverse direction, wherewith one or more of the incoming conveyor belts 1 can be connected to the upper point of associated connecting loops, which thus transfer the products to one of the outgoing conveyor belts 2 or 3 connected beneath the conveyor belt 1. Naturally, it is also possible to reverse the conveying direction of the belts 2 or 3, or both, wherewith the conveying direction of both the belts 1 and the connecting loops 4 is reversed simultaneously, when desiring to move products from a number of positions in a system to a number of common collecting stations.

FIGS. 2–4 illustrate a preferred arrangement of connecting loops and conveyor belts, in which the connecting loops are placed in pairs with a space between each pair. As will be seen from FIG. 2, the downwardly extending portion 7 of the coupling loop is located externally of the loop so that the outgoing belts 2 are not obstructed by said portion, wherewith free connection of a conveyor belt to the upper or lower end point of the connecting loop can be arranged unimpeded.

As mentioned in the aforegoing, each of the connecting loops is continuously driven and the drive means may be conveniently coupled to any of the direction rollers 10 at the upper or lower end of the connecting loop. As illustrated in FIGS. 5–7 with the exemplary system a drive motor 11 is connected over suitable reduction gearing to the upper direction roller 10. The movement direction of the drive means is thus such that the upper portion of the connecting loop is drawn by the roller 10 engaging the loop. The roller thus serves as a direction roller and as a drive roller and is provided with teeth for engagement with corresponding teeth on the conveying surface of the connecting loop. The direction in which the connecting loop moves is indicated with arrows in FIGS. 5–7. When it is desired to drive the loop in the opposite direction, the lower roller 10 is connected to the drive means 11 in a corresponding manner, the direction of movement then being opposite to that indicated by the arrows. The drive means and the rollers are arranged for rotation around fixed shafts located in the aforementioned frame structure (not shown). As will be evident from the drawings, during movement thereof the connecting loops are curved around two axes extending at right angles to each other. To enable the connecting loop to be deflected in two planes in this manner, it is suitably given the form of an apron conveyor, the links of the loop being journalled to each other to permit relative movement along two axes at right angles to each other. The connecting loop is hence deflected in its conveying plane and in a plane perpendicular thereto.

The coupling means between the curved end portions of the connecting loop and the conveyor belts 2 and 3 extending tangentially thereto may be of conventional construction as illustrated in FIGS. 8–10. FIG. 8 and corresponding projection shown in FIG. 10 illustrate an arrangement where no transfer of the products between the connecting loop and the conveyor belt takes place. In this instance the products are guided past the tangentially extending conveyor belt in arcuate guides 12. FIG. 9 and corresponding projection shown in FIG. 10 illustrate connection of the loop to the conveyor belt. The units being advanced in the direction indicated by the arrows are transferred to the conveyor belt in guides 13.

The invention has been described with reference to an embodiment thereof particularly intended for disposable glass containers. It will be readily perceived, however, that the principle of the invention can be applied to other similar types of conveyor systems for distributing products from a starting position to different receiving stations by means of a series of conveyor belts.

What I claim is:

1. A conveyor system comprising a first group of incoming continuously operating conveyor belts a second group of outgoing continuously operating conveyor belts at least two endless connecting loops extending between said groups and each loop comprising a continuously operating conveyor belt guided over direction rollers so as to include a helical section having opposed curved first portions extending over said direction rollers and generally straight second portions extending between said curved portions, and a downwardly extending portion from top to bottom of said helical section, and coupling means for selectively connecting and disconnecting the connecting loop to and from the incoming and outgoing conveyor belts.

2. A system according to claim 1, characterized in that the incoming and outgoing conveyor belts are connected to the connecting loop at its curved portions.

3. A system according to claim 2, characterized in that a number of said conveyor belts of said groups are connected by said coupling means disposed in a first plane to a corresponding number of said connecting loops, and that a number of other conveyor belts of said groups are arranged in superposed array and are connected by other of said coupling means to the connecting loops at a distance from said first plane.

4. A system according to claim 3, characterized in that a number of superposed conveyor belts of said groups are connected to first curved portions of the connecting loops and that a further number of superposed conveyor belts of said groups are connected to second curved portions of said loops diametrically opposite said first curved portions.

5. A system according to claim 1, characterized in that the downwardly extending third portion of the connecting loop extends beyond the uppermost and lowermost point of the helical portion of the loop and passes over direction rollers at the upper and lower point of said helical portion, each of said direction rollers being arranged to drive the connecting loop in respective opposite directions by traction engagement with the connecting loop.

6. A system according to claim 3 in which the connecting loop belt is arranged to be deflected in the conveying plane and in a plane at right angles thereto by being pivoted, and including means for driving a selected one of said direction rollers.

* * * * *